Patented Oct. 27, 1931

1,829,178

UNITED STATES PATENT OFFICE

VICTOR YNGVE, OF NIAGARA FALLS, NEW YORK, ASSIGNOR TO NATIONAL CARBON COMPANY, INC., A CORPORATION OF NEW YORK

ELECTROLYTE FOR ELECTROLYTIC CONDENSERS

No Drawing.   Application filed March 29, 1930. Serial No. 440,168.

This invention relates to electrolytic condensers which depend for their action upon the properties of the dielectric film which may be formed electrolytically upon the surface of aluminum or other so-called filming electrodes when the same are immersed in certain electrolytes and subjected to electric current. It has particular reference to a new and improved electrolyte for use in condensers of this nature.

Such an electrolyte should be a conductor of electric current and should act to maintain the dielectric film upon the aluminum or other anode with which it may be used. The most common electrolytes consist of a liquid solution of metallic salts or salts of ammonia usually in an aqueous solvent.

In accordance with my invention an electrolyte is provided which has the necessary conducting and film maintaining properties and which will act to produce an improved condenser unit having a very rapid drop in initial leakage when placed in a circuit, and also a very low final leakage after being in circuit for a considerable length of time. It has the further advantage of being especially useful in certain forms in condensers known as the "dry" type which employ a non-liquid electrolyte. Through the use of a proper non-aqueous solvent a practically non-freezing electrolyte is produced.

The electrolyte of my invention consists essentially of a fatty acid soap in which a salt of a fatty acid containing five or more carbon atoms is dissolved in an aqueous solvent or a mixture of water and an organic solvent in which the organic solvent predominates. The concentration of the soap solution is preferably sufficient to form a gel.

The alkali salts of the higher homologues of the fatty acid series are well known soaps, as are also the same salts of oleic and linoleic acid. While the latter two acids are not strictly homologues of the fatty acid series, it is intended that they be included within the term "fatty acid" as used herein throughout the specification and claims. These salts are soluble, perhaps colloidally, in water, and in higher concentrations will set to a gel. I have found that such soap solutions are especially advantageous as an electrolyte for electrolytic condensers. In the gel form, which resembles a colloidal solution rather than a true one, they are highly desirable in the "dry" type condenser.

The salts of any of the fatty acid series containing five or more carbon atoms with the basic element of ammonia, sodium, and potassium may be used. Organic base soaps, especially those of the alkyl amines, may also be used, preferably in combination with the above mentioned salts. While these salts are all soluble in water it is advantageous in many cases to use along with the aqueous solvent a non-aqueous organic solvent such as glycerine or ethylene glycol. With the addition of the latter solvents in predominating proportions the resulting electrolyte is non-freezing at temperatures of ordinary usage.

A preferred electrolyte solution may consist of sodium stearate, and diethylamine stearate in a solvent of water and ethylene glycol or glycerine, the proportions of combined stearates to solvent being sufficient to form a gel. I have found that approximately 20 parts of fatty acid salts to 100 parts of solvent is necessary to form a gel, so that a satisfactory liquid electrolyte may be made with a proportion of 15 parts of solute to 100 parts of solvent, whereas with the gel from 30 parts of solute to 100 parts of solvent is a sufficiently high proportion to insure a satisfactory electrolyte for a "dry" type condenser. The solvent mixture should contain at least 5% of water and preferably not over 30%, with the remainder ethylene glycol or glycerine.

A typical composition of a suitable electrolyte including only one of the fatty acid salts mentioned may contain 20 parts of sodium stearate, 95 parts of ethylene glycol, and 5 parts of water. A preferred solution would also contain a diethylamine salt of a fatty acid and have approximately the following formula: 20 parts of sodium stearate, 10 parts of diethylamine stearate, 95 parts of ethylene glycol, and 5 parts of water.

The electrolyte of my invention may be employed in condensers in which any of the conventional types of assembly are used. It may be used in liquid form in any construction which is adapted for use with a liquid electrolyte, and is especially suitable in the gel form as an electrolyte for a "dry" type condenser. The usual rolled or folded type of condenser consists of an anode and cathode in the shape of thin strips which are placed one on the other, spaced from each other by a separator of bibulous paper or cloth, and formed into a roll or other form of compact unit. The separators of such a unit may be impregnated after the assembly is completed with a warm soap solution as disclosed which will set to a gel on cooling. Or the separator may be eliminated entirely by first applying a soap film to one or both electrodes and then rolling or folding them into the shape desired while the solution is still plastic. The same method may be applied to condensers with parallel or interleaved plates which are assembled and then pressed together. Thus the soap solution may act as a separator as well as an electrolyte and no other material is necessary for preventing short circuit between the anode and cathode.

I claim:

1. An electrolyte for an electrolytic condenser comprising a solution of an alkali metal salt of a fatty acid containing at least five carbon atoms, the concentration of said solution being sufficient to form a gel.

2. An electrolyte for an electrolytic condenser comprising an alkali metal salt of a fatty acid, an organic base salt of a fatty acid, and a solvent for said salts.

3. An electrolyte for an electrolytic condenser comprising a sodium salt of a fatty acid, an alkyl amine salt of a fatty acid, and a common solvent for said salts.

4. An electrolyte for an electrolytic condenser comprising a sodium salt of a fatty acid, a diethylamine salt of a fatty acid, and a common solvent for said salts, said solvent consisting of water and an organic solvent.

5. A gelatinized soap solution for use as an electrolyte in an electrolytic condenser comprising sodium stearate, diethylamine stearate, and a solvent, said solvent consisting of a mixture of water with a predominating amount of an organic solvent.

6. A gelatinized soap solution for use as an electrolyte in an electrolytic condenser comprising sodium stearate, diethylamine stearate, and a solvent, said solvent consisting of water and glycerine with the glycerine predominating.

7. An electrolyte for an electrolytic condenser comprising 10 to 25 parts of sodium stearate, 5 to 15 parts of diethylamine stearate, 70 to 90 parts of glycerine, and 5 to 30 parts of water.

8. An electrolyte for an electrolytic condenser comprising 20 parts of sodium stearate, 10 parts of diethylamine stearate, 95 parts of glycerine, and 5 parts of water.

In testimony whereof, I affix my signature.

VICTOR YNGVE.